United States Patent
Dettori et al.

(10) Patent No.: US 10,586,131 B2
(45) Date of Patent: Mar. 10, 2020

(54) MULTIMEDIA CONFERENCING SYSTEM FOR DETERMINING PARTICIPANT ENGAGEMENT

(71) Applicant: INTERNATIONAL BUSINESS MACHINES CORPORATION, Armonk, NY (US)

(72) Inventors: Paolo Dettori, Hartsdale, NY (US); Frank Andre Schaffa, Hartsdale, NY (US); Daniel Smilkov, Yorktown Heights, NY (US); Peter Hans Westerink, Ossining, NY (US); Chai Wah Wu, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 15/646,823

(22) Filed: Jul. 11, 2017

(65) Prior Publication Data

US 2019/0019067 A1  Jan. 17, 2019

(51) Int. Cl.
*G06K 9/62* (2006.01)
*G06K 9/00* (2006.01)
*H04N 7/14* (2006.01)

(52) U.S. Cl.
CPC ....... *G06K 9/6269* (2013.01); *G06K 9/00335* (2013.01); *H04N 7/147* (2013.01)

(58) Field of Classification Search
CPC ...... H04N 7/147; H04N 7/15; G06K 9/00288; G06K 9/00369; G06K 9/00597
USPC .............. 382/159; 715/753; 348/14.08; 379/202.01
See application file for complete search history.

(56) References Cited

U.S. PATENT DOCUMENTS

| | | | |
|---|---|---|---|
| 7,768,543 B2 | 8/2010 | Christiansen | |
| 8,392,503 B2 | 3/2013 | Kuhlke et al. | |
| 8,516,105 B2 | 8/2013 | Chawla et al. | |
| 9,256,860 B2* | 2/2016 | Herger | H04N 7/15 |
| 9,445,050 B2* | 9/2016 | Travis | H04N 7/15 |
| 9,722,965 B2* | 8/2017 | Cecchi | H04L 51/34 |
| 10,116,801 B1 | 10/2018 | Christiano et al. | |
| 10,218,852 B2 | 2/2019 | Lee et al. | |
| 2010/0253689 A1 | 10/2010 | Dinicola et al. | |
| 2018/0121214 A1 | 5/2018 | Faulkner et al. | |

* cited by examiner

*Primary Examiner* — Charlotte M Baker
(74) *Attorney, Agent, or Firm* — F. Chau & Associates, LLC (57) ABSTRACT

A method for operating a teleconference includes receiving a first video and audio signal from a first teleconference participant and receiving a second video and audio signal from a second teleconference participant. The method further includes relaying the first video and audio signal to the second teleconference participant and relaying the second video and audio signal to the first teleconference participant. The method additionally includes analyzing the first video and audio signal using a plurality of behavior analytics to determine a level of participant engagement of the first teleconference participant. The method further includes determining that the first teleconference participant is not engaged when the determined level of participant engagement is below a predetermined threshold.

18 Claims, 6 Drawing Sheets

MULTIMEDIA CONFERENCING SYSTEM FOR DETERMINING PARTICIPANT ENGAGEMENT

BACKGROUND

1. Technical Field

The present inventive concept relates to telecommunications and, more specifically, to a multimedia conferencing system for determining participant engagement.

2. Discussion of Related Art

Currently, teleconferences can be performed by, for example, telephone, through the internet by voice over internet protocol (VoIP) or videoconferencing over the internet. As telecommunication technology has improved, videoconferencing has become more popular. Videoconferencing applications allow for audio and video of multiple participants to be transmitted to each other. Further, participants may share documents and perform presentations during the videoconference.

However, during a teleconference, participants may engage in behavior that is not related to the teleconference and may be distracting for other participants engaged in the teleconference. This behavior may disrupt the entire teleconference.

SUMMARY

According to an exemplary embodiment of the present inventive concept, a method for operating a teleconference includes receiving a first video and audio signal from a first teleconference participant and receiving a second video and audio signal from a second teleconference participant. The method further includes relaying the first video and audio signal to the second teleconference participant and relaying the second video and audio signal to the first teleconference participant. The method additionally includes analyzing the first video and audio signal using a plurality of behavior analytics to determine a level of participant engagement of the first teleconference participant. The method further includes determining that the first teleconference participant is not engaged when the determined level of participant engagement is below a predetermined threshold.

In an exemplary embodiment of the present inventive concept, when it is determined that the first teleconference participant is not engaged, relaying of the first video and audio signal to the second teleconference participant is temporarily discontinued.

In an exemplary embodiment of the present inventive concept, the method for operating a teleconference further includes continuing to analyze the first video and audio signal using the plurality of behavior analytics to determine the level of participant engagement of the first teleconference participant. The method additionally includes determining that the first teleconference participant has reengaged when the determined level of participant engagement is above the predetermined threshold. The method further includes resuming the relaying of the first video and audio signal to the second teleconference participant when it is determined that the first teleconference participant has reengaged.

In an exemplary embodiment of the present inventive concept, at least one additional video and audio signal is received from at least one additional teleconference participant, the first and second video and audio signals are relayed to the at least one additional teleconference participant, and the at least one additional video and audio signal is relayed to each of the first and second teleconference participants.

In an exemplary embodiment of the present inventive concept, the method for operating a teleconference further includes analyzing the second video and audio signal using the plurality of behavior analytics to determine a level of participant engagement of the second teleconference participant. The method additionally includes determining that the second teleconference participant is not engaged when the determined level of participant engagement of the second teleconference participant is below the predetermined threshold.

In an exemplary embodiment of the present inventive concept, when it is determined that the second teleconference participant is not engaged, relaying of the second video and audio signal to the first teleconference participant is temporarily discontinued.

In an exemplary embodiment of the present inventive concept, when it is determined that the first teleconference participant is not engaged, relaying of the first video and audio signal to the second teleconference participant is performed at a reduced bandwidth.

In an exemplary embodiment of the present inventive concept, when it is determined that the first teleconference participant is not engaged, resolution is reduced, and/or volume is reduced or muted. When it is determined that the first teleconference participant is reengaged, the resolution is increased, and/or the volume is increased or unmuted.

In an exemplary embodiment of the present inventive concept, the plurality of behavior analytics may include determining whether the first teleconference participant is talking to someone or something other than the teleconference. The plurality of behavior analytics may further include determining whether the first teleconference participant has turned away from the teleconference. The plurality of behavior analytics may additionally include determining whether the first teleconference participant is engaged in operating, or is receiving a ring from, a telephone unrelated to the teleconference. The plurality of behavior analytics may further include determining a level of alertness of the first teleconference participant. The plurality of behavior analytics may further include determining an emotional state of the first teleconference participant.

In an exemplary embodiment of the present inventive concept, the plurality of behavior analytics used to determine the level of participant engagement of the first teleconference participant are generated using one or more machine learning techniques.

In an exemplary embodiment of the present inventive concept, one or more of the plurality of behavior analytics is refined using input from the first or second teleconference participants during the teleconference.

According to an exemplary embodiment of the present inventive concept, a method for training a classifier for determining whether a teleconference participant is engaged in a teleconference, includes receiving a plurality of video and audio signals from one or more teleconference participants participating in one or more teleconferences. The method further includes receiving classification data classifying the one or more teleconference participants as engaged or not engaged, based on their observed behavior. The method additionally includes using one or more computer learning techniques to train the classifier for determining whether a teleconference participant is engaged in a teleconference, using the receiving a plurality of video and audio signals from one or more teleconference participants participating in one or more teleconferences and the received classification data, as training data.

In an exemplary embodiment of the present inventive concept, the trained classifier is used to determine whether two or more participants in a subsequent teleconference are engaged.

In an exemplary embodiment of the present inventive concept, the trained classifier is refined during the subsequent teleconference based on input from the two or more participants.

According to an exemplary embodiment of the present inventive concept, a computer program product for operating a teleconference, the computer program product comprising a computer readable storage medium having program instructions embodied therewith, the program instructions executable by a computer to cause the computer to receive, by the computer, a first video and audio signal from a first teleconference participant, receive, by the computer, a first video and audio signal from a second teleconference participant, relaying, by the computer, the first video and audio signal to the second teleconference participant and relaying, by the computer, the second video and audio signal to the first teleconference participant, analyzing, by the computer, the first video and audio signal using a plurality of behavior analytics to determine a level of participant engagement of the first teleconference participant, and determining, by the computer, that the first teleconference participant is not engaged when the determined level of participant engagement is below a predetermined threshold.

In an exemplary embodiment of the present inventive concept, when it is determined that the first teleconference participant is not engaged, relaying of the first video and audio signal to the second teleconference participant is temporarily discontinued.

In an exemplary embodiment of the present inventive concept, when it is determined that the first teleconference participant is not engaged, relaying of the first video and audio signal to the second teleconference participant is performed at a reduced bandwidth.

In an exemplary embodiment of the present inventive concept, the plurality of behavior analytics may include determining whether the first teleconference participant is talking to someone or something other than the teleconference. The plurality of behavior analytics may further include determining whether the first teleconference participant has turned away from the teleconference. The plurality of behavior analytics may additionally include determining whether the first teleconference participant is engaged in operating, or is receiving a ring from, a telephone unrelated to the teleconference. The plurality of behavior analytics may further include determining a level of alertness of the first teleconference participant. The plurality of behavior analytics may further include determining an emotional state of the first teleconference participant.

In an exemplary embodiment of the present inventive concept, the plurality of behavior analytics used to determine the level of participant engagement of the first teleconference participant are generated using one or more machine learning techniques.

In an exemplary embodiment of the present inventive concept, one or more of the plurality of behavior analytics is refined using input from the first or second teleconference participants during the teleconference.

BRIEF DESCRIPTION OF THE DRAWINGS

A more complete appreciation of the present inventive concept and many of the attendant aspects thereof will be readily obtained as the same becomes better understood by reference to the following detailed description when considered in connection with the accompanying drawings, wherein.

DETAILED DESCRIPTION

In describing exemplary embodiments of the present inventive concept illustrated in the drawings, specific terminology is employed for sake of clarity. However, the present inventive concept is not intended to be limited to the specific terminology so selected, and it is to be understood that each specific element includes all technical equivalents which operate in a similar manner.

The present inventive concept provides a method for operating a teleconference and a computer program product for operating the teleconference. The method for operating the teleconference determines whether a participant is intending to participate in the teleconference or is presently engaged in activities unrelated to the teleconference, such as typing, engaging in another phone call, distracted, or temporarily stepping away from the teleconference. When it is determined that the participant is not engaged in the teleconference, the participant's audio and/or video bandwidth may be reduced or the participant may be temporarily disconnected, muted, and/or otherwise removed from the teleconference.

The present inventive concept provides a method for training a classifier for determining whether a teleconference participant is actually engaged in the teleconference.

Exemplary embodiments of the present inventive concept will be described more fully hereinafter with reference to the accompanying drawings. Like reference numerals may refer to like elements throughout the specification and drawings.

Figure 1:
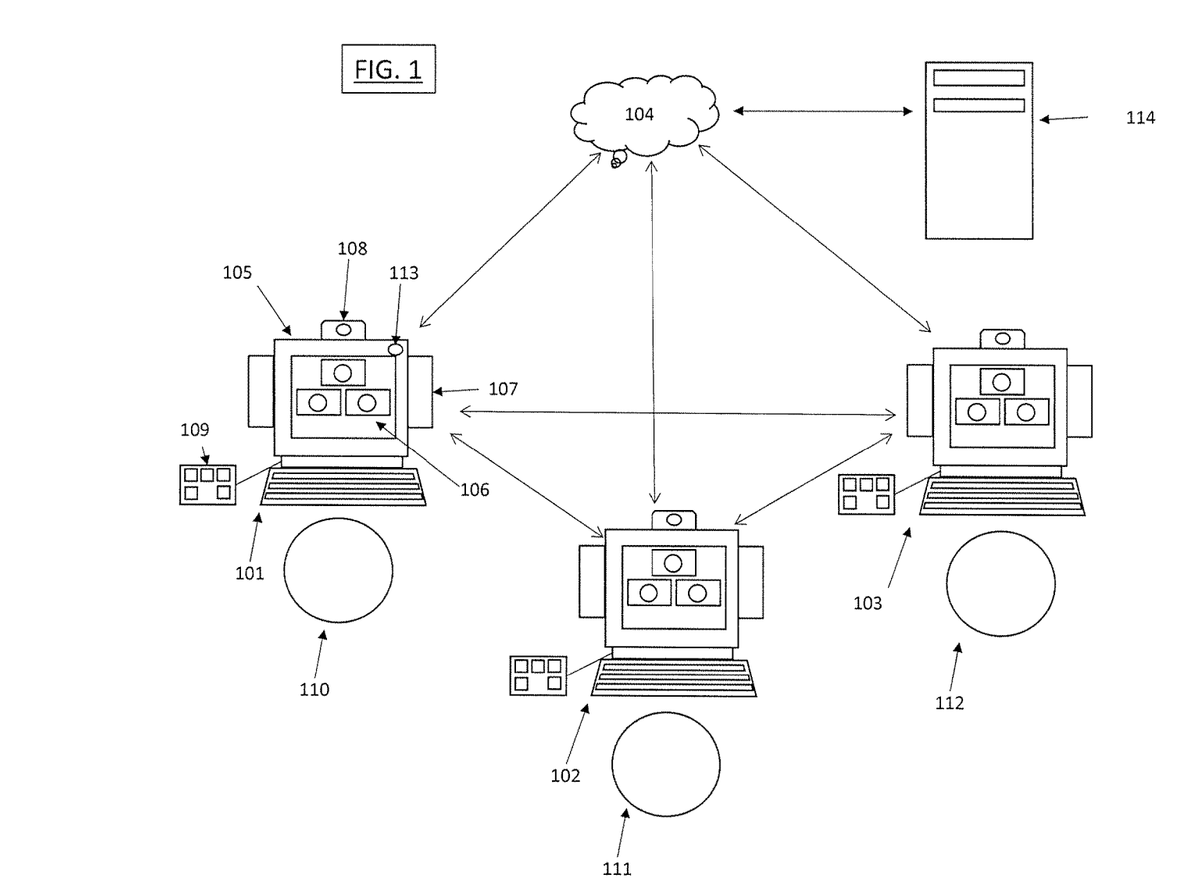
FIG. 1 is a schematic diagram illustrating a computing network according to an exemplary embodiment of the present inventive concept.

FIG. 1 is a schematic diagram illustrating a computing network according to an exemplary embodiment of the present inventive concept. In FIG. 1 a first teleconference terminal unit 101, a second teleconference terminal unit 102 and a third teleconference terminal unit 103, a computer network 104 and a server 114 are illustrated. Data may transfer between the teleconference terminal units 101, 102 and 103, and the server 114 through the computer network 104. Examples of computer networks include, for example, local area networks (LAN) and wide area networks (WAN), such as the internet. In addition, the methods for operating a teleconference and for training a classifier, which will be both be discussed later, may be stored on the server 114 which may be accessed by the computer network 104.

In an exemplary embodiment of the present inventive concept, the teleconference terminal units 101, 102 and 103 may transfer data between each other without the use of the computer network 104 and server 114. In addition, the methods for operating the teleconference and for training a classifier may be stored on each teleconference terminal unit 101, 102 and 103.

Each teleconference terminal unit 101, 102, and 103 may include a display unit 105, a speaker 107, a microphone 113, a camera 108, a teleconference control device 109. In addition, the first, second and third teleconference terminal units 101, 102, and 103 may be operated by a first, a second and a third teleconference participant 110, 111 and 112, respectively. For example, the teleconference terminal units 101, 102 and 103 may each be a personal computer, tablet, laptop, notebook, smartphone, or dedicated teleconferencing appliance.

The display unit 105 is configured to display teleconference frames 106 of teleconference participants.

The speaker 107, the microphone 113, the camera 108 are each connected to the teleconference terminal unit 101, 102 and 108.

The teleconference control device 109 is connected to a teleconference terminal unit 101, 102 and 103 and may include a plurality of buttons for the first teleconference participant 110 to provide a response (e.g., user feedback) to observed behavior demonstrating that the second or third teleconference participants 111 or 112 are not engaged in the teleconference. The teleconference control device 109 may include a mute button, volume buttons, a teleconference frame 106 on/off button, and/or rating buttons. For example, the rating buttons may include a high rating button indicating a high level of engagement in the teleconference and a low rating button indicating a low level of engagement in the teleconference. The ratings buttons may be a way to provide feedback to the computer network 104 and server 114 as to whether a determined level of engagement of a teleconference participant is accurate. As an additional example, when the high or low rating button is pressed in response to an observed behavior of a teleconference participant 110, 111 or 112, a signal may be sent to the computer network 104 and corresponding instructions are sent to the other teleconference participants 110, 111 or 112 to either raise or lower, respectively, a bandwidth of a teleconference participant 110, 111 or 112. Further, the present inventive concept is not limited to physical rating buttons. For example, a slider or another form of controls may be provided.

Further, the teleconference terminal units 101, 102 and 103 may engage in a teleconference with each other through wireless communication, cables, or any other means of connecting teleconference terminal units 101, 102 and 103 to each other. For example, video and audio signals may be transmitted and received between the first teleconference terminal unit 101, the second teleconference terminal unit 102, and the third teleconference terminal unit 103.

The teleconference terminal units 101, 102 and 103 may send video and audio signals through the computer network 104 to the server 114 to determine whether the teleconference participant 110, 111 or 112 is not engaged in the teleconference. In addition, each teleconference participant 110, 111 and 112 may refine behavior analytics by providing input from the teleconference terminal units 101, 102 and 103 to the computer network 104. For example, the refinement of the behavior analytics may be done by using the teleconference control device 109 and a keyboard connected to the teleconference terminal unit 101, 102 and 103. For example, when a button is pushed on the teleconference control device 109, a corresponding signal including behavioral data is sent from that teleconference terminal unit 101, 102 or 103 to the computer network 104. Further, the computer network 104 may send instructions to the teleconference terminal units 101, 102 and 103 when it is determined that the participant is not engaged in the teleconference. For example, the computer network 104 may send instructions to the first teleconference terminal unit 101 to temporarily disconnect, mute, and/or otherwise remove the first teleconference terminal unit 101 from the teleconference.

Figure 2:
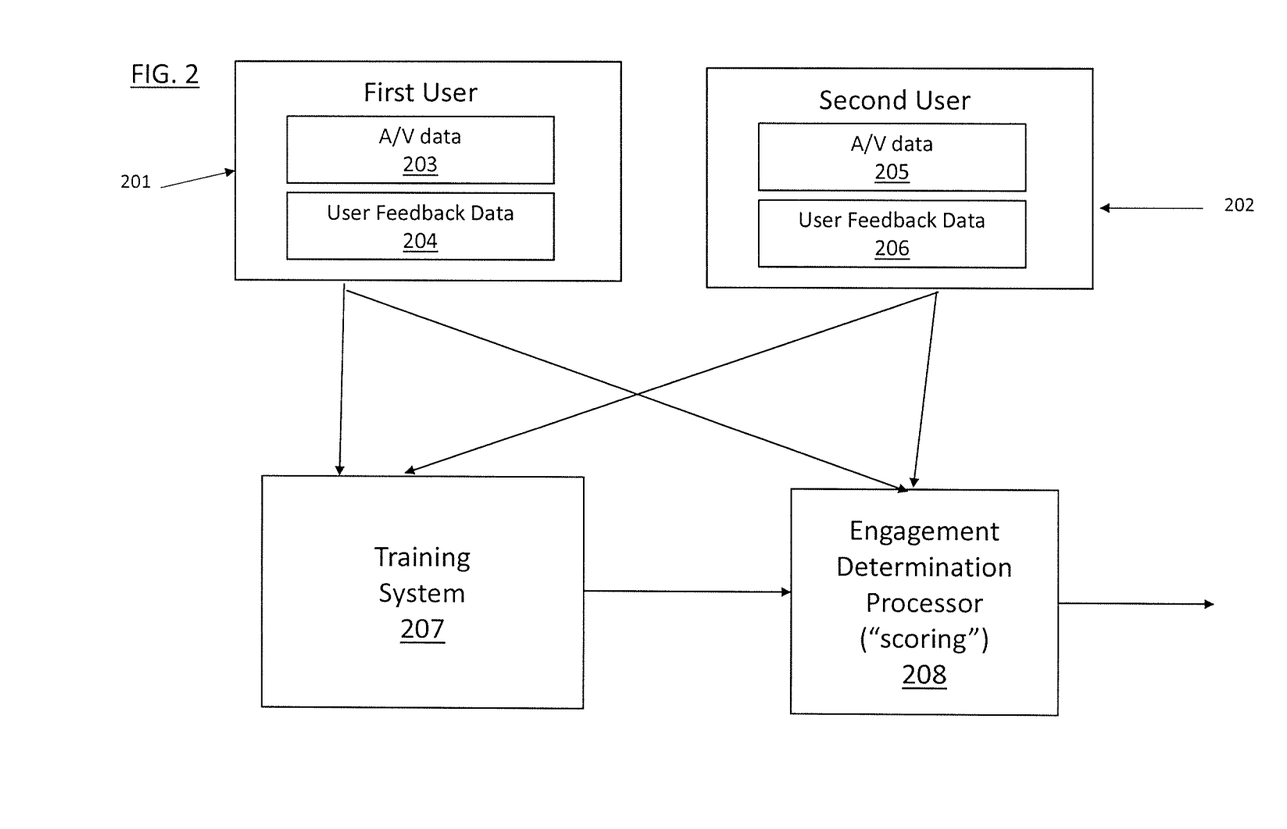
FIG. 2 is a block diagram illustrating a teleconference system according to an exemplary embodiment of the present inventive concept.

FIG. 2 is a block diagram illustrating a teleconference system according to an exemplary embodiment of the present inventive concept.

In FIG. 2, a first user 201, a second user 202, a training system 207, and an engagement processor 208 are illustrated.

The first user 201 has audio and video data 203 that is transferred to the training system 207. Further, the first user 201 has first user feedback data 204 that is also transferred to the training system 207.

The second user 202 has audio and video data 205 that is transferred to the training system 207. Further the second user 202 has second user feedback data 206 that is also transferred to the training system 207.

The first and second users 201 and 202 may be using the teleconference terminal units 101, 102 and 103 described above in FIG. 1. For example, the teleconference terminal units 101, 102 and 103 used by the first and second users 201 and 202 and may include the audio and video data 203 and 205 and the first and second user feedback data 204 and 206.

The first and second user feedback data 204 and 206 may be data indicating that a particular behavior of a teleconference participant demonstrates engagement or non-engagement in the teleconference. Further, the feedback data 204 and 206 may include a requested action in response to a particular behavior of a teleconference participant. For example, muting a teleconference participant who is on a telephone during the teleconference.

Further, the first user 201 transfers audio and video data 203 and first user feedback data 204 to the training system 207. In addition, the second user 202 transfers audio and video data 205 and second user feedback data 206 to the training system 207.

The training system 207 uses the audio and video data 203 and 205 and the first and second user feedback data 204 and 206 to generate a model to recognize when a teleconference participant is not engaged in the teleconference and to determine a level of engagement of teleconference participants. Further, as audio and video data and user feedback data is continuously provided to the training system 207 throughout one or more teleconferences, the model is continuously updated. The model is then transferred to the engagement determination processor 208. In addition, the engagement determination processor 208 receives the audio and video data 203 and 205 from the first and second users 201 and 202, respectively.

Figure 3:
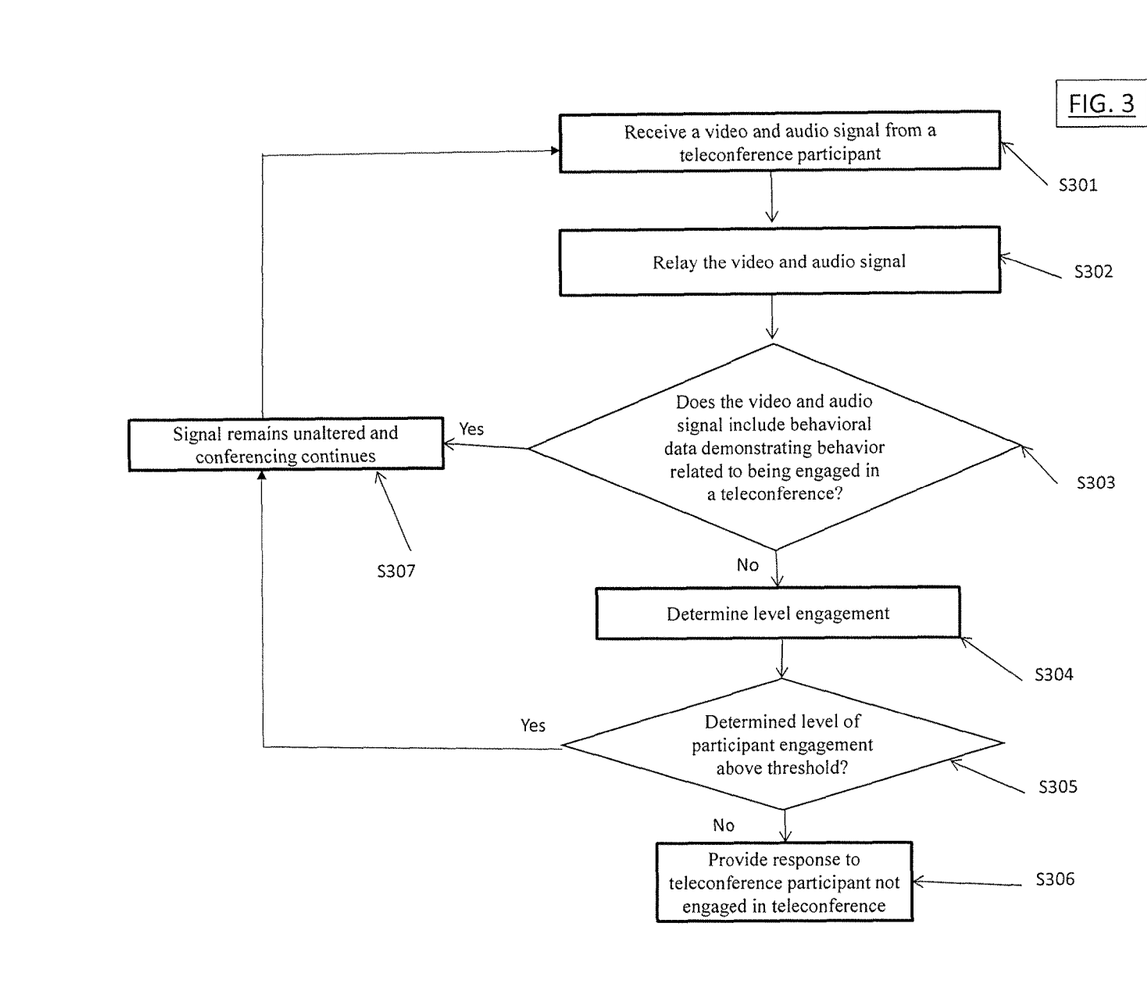
FIG. 3 is a flowchart illustrating a method for operating a teleconference according to an exemplary embodiment of the present inventive concept.

The engagement determination processor 208 may use the model to determine a level of engagement for each participant in the teleconference based on respectively received audio and video data 203 and 205 from each of the teleconference participants (e.g., the first and second users 201 and 202). For example, the engagement determination processor 208 may provide a level of engagement for the first user 201 based on the audio and video data 203 provided by the first user 201, and the engagement determination processor 208 may provide a level of engagement for the second user 202 based on the audio and video data 205 provided by the second user 202. Further, the level of engagement of each teleconference participant may be sent to all teleconference participants. Based on the level of engagement of the teleconference participant, an action in response to the level of engagement may occur. For example, a teleconference participant with a low level of engagement may be muted. FIG. 3 shows a flowchart of a method for operating a teleconference according to an exemplary embodiment of the present inventive concept.

According to an exemplary embodiment of the present inventive concept, a method for operating a teleconference is provided.

In step S301, a video and audio signal is received from a teleconference participant. A first video and audio signal may be transmitted from a first teleconference participant and may be received by, for example, a server 114, a teleconference terminal unit 101, 102 and 103 or a computing device. The first teleconference participant is a user of a teleconference terminal unit 101, 102 and 103, which includes a microphone, display, and camera, to engage in the teleconference. The video and audio signal may include data of images and sound of the teleconference participant and of the surrounding environment of the teleconference participant.

In addition, multiple video and audio signals may be received from multiple teleconference participants that are participating in the same conference as each other. For example, the multiple video and audio signals may be transmitted from the multiple teleconference participants and may be received by, for example, a server 114, a teleconference terminal unit 101, 102 and 103, or a computing device.

In step S302, in the teleconference, the video and audio signal of the teleconference participant is relayed to other teleconference participants engaged in the same teleconference. For example, the first video and audio signal may be relayed to a second teleconference participant engaged in the same teleconference. The second teleconference participant may relay a second video and audio signal by using a teleconference terminal unit 101, 102 and 103 including a microphone, display, and a camera. Further, the second video and audio signal may be relayed to the first teleconference participant. However, exemplary embodiments of the present inventive concept are not limited thereto. For example, additionally teleconference participants may relay video and audio signals to each of the first and second teleconference participants and may receive video and audio signals from the first and second teleconference participants.

In step S303, a determination is made as to whether or not the video and audio signal transmitted by the teleconference participant includes behavioral data demonstrating behavior related to a participant engaged in a teleconference. For example, behavioral data related to a participant not engaged in a teleconference may include an image and/or sound of the teleconference participant engaging in an unrelated telephone call, a conversation with a person in the immediate area, or is engaging in any other activity unrelated to the teleconference.

If a determination is made that the teleconference participant is engaged (e.g., a "yes" to S303) in the teleconference, then the video and audio signal transmitted by the teleconference participant will remain unaltered and the teleconference will continue (step S307). Further, the method for operating the teleconference may be in a continuous operation to continue determining whether the teleconference participants are engaged in the teleconference for as long as teleconferencing is ongoing.

If a determination is made that the teleconference participant is not engaged (e.g., a "no" to S303) in the teleconference, then a determination as to a level of engagement in the teleconference by the teleconference participant (step S304) is made. The determination of the level of participant engagement may be performed by analyzing the video and audio signals of the teleconference participants. For example, the first and second video and audio signals may be analyzed by using a plurality of behavior analytics to determine a level of participant engagement of the first and second teleconference participants. The actions being performed by the teleconference participants will be compared to behavioral data of the behavioral analytics. The level of engagement may be based on an intent of the teleconference participant to be engaged or not engaged in the teleconference. The type of activity and the duration of the activity will be analyzed. For example, if a teleconference participant was on the phone for a relatively short period of time during a teleconference, then that may indicate a medium to high level of participant engagement. However, if the teleconference participant was on the phone for a relatively high period of time, then that might indicate a relatively low level of participant engagement.

The plurality of behavior analytics used to determine the level of participant engagement of the first teleconference participant may be generated using one or more machine learning techniques. For example, the machine learning techniques may include association rule learning, artificial neural networks, deep learning, inductive logic programming, rule based machine learning and/or learning classifier systems.

In addition, one or more of the plurality of behavior analytics may be refined by input from a teleconference participant during the teleconference. The teleconference participant may refine one or more of behavior analytics by inputting into a device that a particular behavior demonstrates that a teleconference participant is not engaged in the teleconference. For example, the teleconference participant may explicitly indicate non-engagement in the teleconference, or the teleconference participant may modify existing behavior analytics to indicate that a teleconference participant is engaged or not engaged in the teleconference. Further, the teleconference participant may adjust settings of the machine learning techniques. The teleconference participant may provide an input by using, for example, a keyboard or another input device, which will be described in further detail later.

The behavior analytics for determining the level of participant engagement in the teleconference may include for example, determining whether the first teleconference participant is talking to someone or something unrelated to the teleconference, whether the first teleconference participant has turned away from his or her camera/microphone, or whether the first teleconference participant is engaged in operating, or is receiving a telephone call unrelated to the teleconference. The duration of the aforementioned activities may be considered to determine the first teleconference participants level of engagement.

The behavior analytics may further include, for example, determining a level of alertness of the first teleconference participant, and/or determining an emotional state of the first teleconference participant through both audio and video signals. In addition, the behavior analytics may recognize human speech, human speech-like sounds, and sounds other than human speech, such as typing, coughing, sneezing, background speech, street noise, etc. Human speech-like sounds may include sounds that are within the frequency of human vocalization or within a similar frequency. For example, human speech-like sounds and non-human sounds that are in a similar frequency may include a grunt, a moan, a mumble, and a sigh. The human speech-like sounds and non-human sounds that are in the similar frequency may be detected by using spectral methods. By detecting these forms of sound previously discussed, human speech may be better detected and recognized because the sounds other than human speech (e.g., background sounds) may be rejected or decreased in volume. Further, the behavior analytics may determine whether the teleconference participant is in the video frame and the teleconference participant's lips are moving, and whether predetermined gestures are being performed (e.g., aggressive gestures). In addition, machine learning techniques may be used to recognize the behavior analytics and then perform a response once a certain behavior has been recognized. For example, if a teleconference participant answers a phone call and moves outside of the video frame, video and audio bandwidth from and to the teleconference participant may be adjusted automatically. As an additional example, if the teleconference participant is being disruptive (e.g., talking over other participants, distracting the other participants, etc.) or not acting in a beneficial manner in the teleconference (e.g., talking about topics unrelated to the teleconference, etc.), bandwidth and/or volume may be reduced based on the behavior analytics, the emotional state, language, etc. of the teleconference participant. In addition, the volume may be muted or the teleconference participant may be disconnected.

To determine a level of alertness of a teleconference participant, a text box may be displayed during the teleconference and the participant may be prompted to reply to the text box, or an alarm may be sounded for the teleconference participant. The time it takes to respond to the text box may also be considered to determine a level of engagement in the teleconference. For example, a first teleconference participant may request that a text box be provided to a second teleconference participant to determine if the second teleconference participant is still interested in the teleconference. To determine the emotional state of the teleconference participant, the behavior analytics may recognize, for example, facial expressions, tone of voice, rate of speech, language being used based on speech recognition, and volume of the teleconference participant's voice. For example, a loud voice may indicate anger or agitation. As an additional example, profanity may indicate the emotional state of the participant (e.g., anger, frustration, agitation, etc.).

In step S305, a determination is made as to whether the determined level of participant engagement is above a pre-determined threshold. The determined level of participant engagement may be determined based on the behavior analytics and whether or not the participant is demonstrating any of the behaviors of the behavior analytics. If the level of participant engagement for a teleconference participant is not above the predetermined threshold, then that may indicate that the teleconference participant is not engaged in the teleconference (e.g., a "no" to step S305). This may indicate, for example, that the participant is temporarily engaged in activities unrelated to the teleconference. If the level of participant engagement is above the predetermined threshold, then that indicates that the teleconference participant is engaged in the teleconference (e.g., a "yes" to step S305). This may indicate that the participant is actively participating or is passively participating in the teleconference (e.g., only listening to and viewing the teleconference).

When it is determined that the teleconference participant (e.g., first or second) is not engaged, a response to the teleconference participant not being engaged in the teleconference will be performed (step S306). For example, relaying of the first video and audio signal of the first teleconference participant to the second teleconference participant may be temporarily discontinued or the relaying may be performed at a reduced bandwidth.

In an exemplary embodiment of the present inventive concept, configurable rules may be implemented for the system to make automated decisions regarding the participant. Rules may include controlling audio and video bandwidth, volume, and size and location of the video based on measurements. In addition, the configurable rules may be user settings or preferences. For example, a configurable rule may be setting a threshold level of engagement for when audio and video transmissions of a participant should be temporarily suspended or turned off for the remainder of the teleconference. There could also be a rule that doesn't allow for audio and/or video to be turned off. As another example, if it is determined that the participant is mostly or fully outside of the video frame, the video and audio bandwidth being received and transmitted by the teleconference participant may be reduced. As an additional example, if the teleconference participant is determined to be angry, the participant's audio being transmitted may have a decreased volume, reduced resolution, reduced video quality and/or reduced bandwidth. In this case, the volume, resolution, video quality and/or bandwidth may be raised when it is determined that the teleconference participant is calm. As another example, if an aggressive gesture is performed by the participant, the participant may be discontinued from the teleconference.

In addition, the configurable rules could be personalized for a certain environment and for certain kinds of persons. For example, the rules could be configured for background noise in a certain environment such as an office, a home, or a car. As an additional example, the rules could be personalized for people with voices higher, lower, or louder than that of other people. For example, a person with a loud voice might not be considered angry or agitated because that is the normal volume of the person's voice. In addition, different models for determining a level of engagement may be provided for personalization of audio and video data from the environment and certain kinds of participants.

In an exemplary embodiment of the present inventive concept, configurable rules may be implemented for the system to make automated decisions regarding an active speaker of the teleconference. For example, the configurable rules may be used to determine the active speaker of the teleconference so that the active speaker may be excluded from being determined as not being engaged in the teleconference.

In an exemplary embodiment of the present inventive concept, the method for operating a teleconference may further include continuing to analyze the first video and audio signal using the plurality of behavior analytics to determine the level of participant engagement of the first teleconference participant. A determination may be made as to whether the first teleconference participant has reengaged in the teleconference when the determined level of participant engagement is above the predetermined threshold. Further, when it is determined that the first teleconference participant is reengaged, relaying of the first video and audio signal to the second teleconference participant may be resumed.

When it is determined that the teleconference participant (e.g., first or second) is engaged, then the video and audio signal transmitted by the teleconference participant will remain unaltered and the teleconference will continue (step S307). Further, the method for operating the teleconference S301 may be in a continuous operation to continue determining whether the teleconference participants are engaged in the teleconference for as long as teleconferencing is ongoing.

Figure 4:
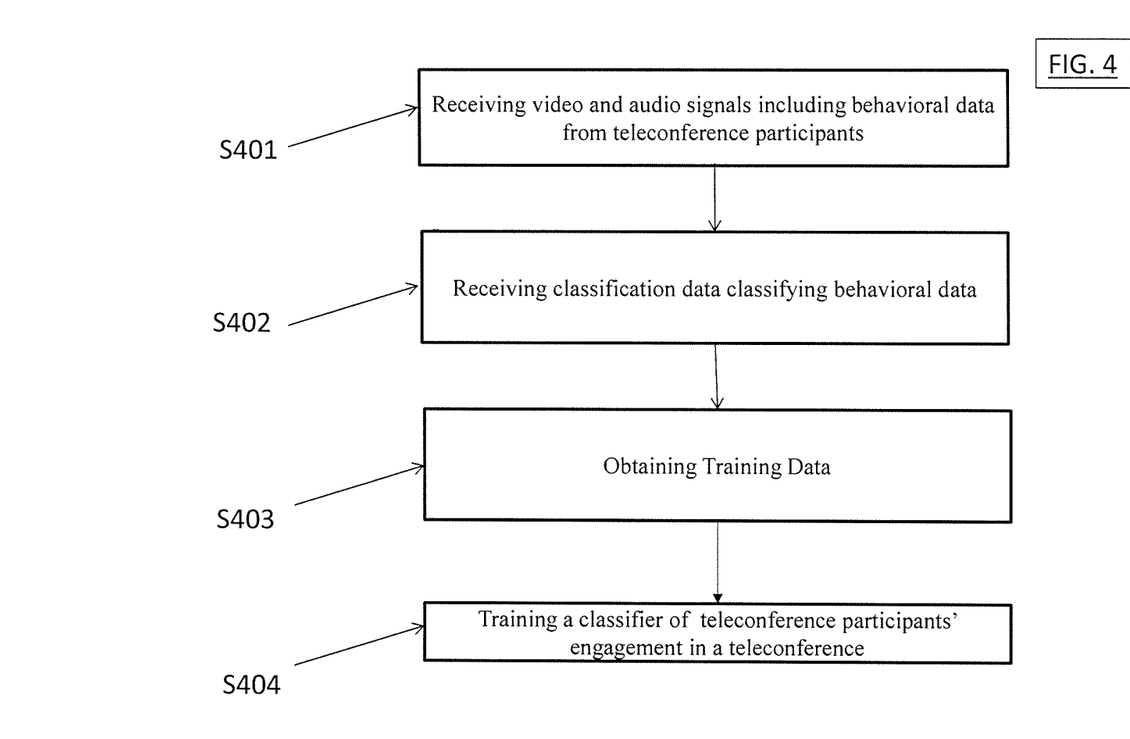
FIG. 4 is a flowchart illustrating a method for training a classifier for determining whether a teleconference participant is engaged in a teleconference according to an exemplary embodiment of the present inventive concept.

FIG. 4 is a flowchart illustrating a method for training a classifier for determining whether a teleconference participant is engaged in a teleconference according to an exemplary embodiment of the present inventive concept. It is understood that elements and features not discussed in detail may be assumed to be similar to corresponding elements and features already discussed.

According to an exemplary embodiment of the present inventive concept, a method for training a classifier for determining whether a teleconference participant is engaged in a teleconference is provided.

In step S401, one or more teleconference participants may receive video and audio signals from other teleconference participants. The video and audio signals may be analyzed to determine the behavioral data of the one or more teleconference participants.

In step S402, classification data classifying the behavioral data of the video and audio signals may be determined from the teleconference participants' audio and video. For example, classification data classifying behavior of teleconference participants showing engagement or non-engagement in a teleconference may be determined. The classification data may be provided by, for example, a user receiving audio and video signals. In addition, predetermined classification data may be transferred to a server 114, a teleconference terminal unit 101, 102 and 103 or a computing device. In addition, a teleconference participant may provide classification data by classifying observed behavior of other teleconference participants during the teleconference.

The classification data may be similar to the behavioral data of the behavior analytics as described in FIG. 3. For example, classification data may relate to behavior classified as either being engaged or not being engaged in the teleconference.

In step S403, training data for training a classifier is obtained. The training data may include the received video and audio signals from the teleconference participants of the teleconference and the classification data. In addition, the training data may further include video and audio signals transmitted in other teleconferences by other teleconference participants.

In step S404, the classifier for determining a teleconference participant's level of engagement in a teleconference is trained. To train the classifier, one or more computer learning techniques may be used. The computer learning techniques may be similar to the machine learning techniques described above with respect to FIG. 3. Further, the computer learning techniques may be used to train classifier by using training data. Training of the classifier may be performed so that observed behavior of a teleconference participant during a teleconference may be identified as either behavior demonstrating engagement or non-engagement in a teleconference.

The training of the classifier may occur before a teleconference has started, during the teleconference, and/or after the teleconference has finished. For example, a classifier already trained may be further refined at a conclusion of a teleconference based on input of teleconference participants. Then, the further trained classifier may be used in a subsequent teleconference to determine whether a teleconference participant is engaged or not engaged in the teleconference.

Further, the trained classifier may be refined by input from the teleconference participant. Additionally, the trained classifier may be refined before, during, or after a subsequent teleconference based on input from the teleconference participant.

Figure 5:
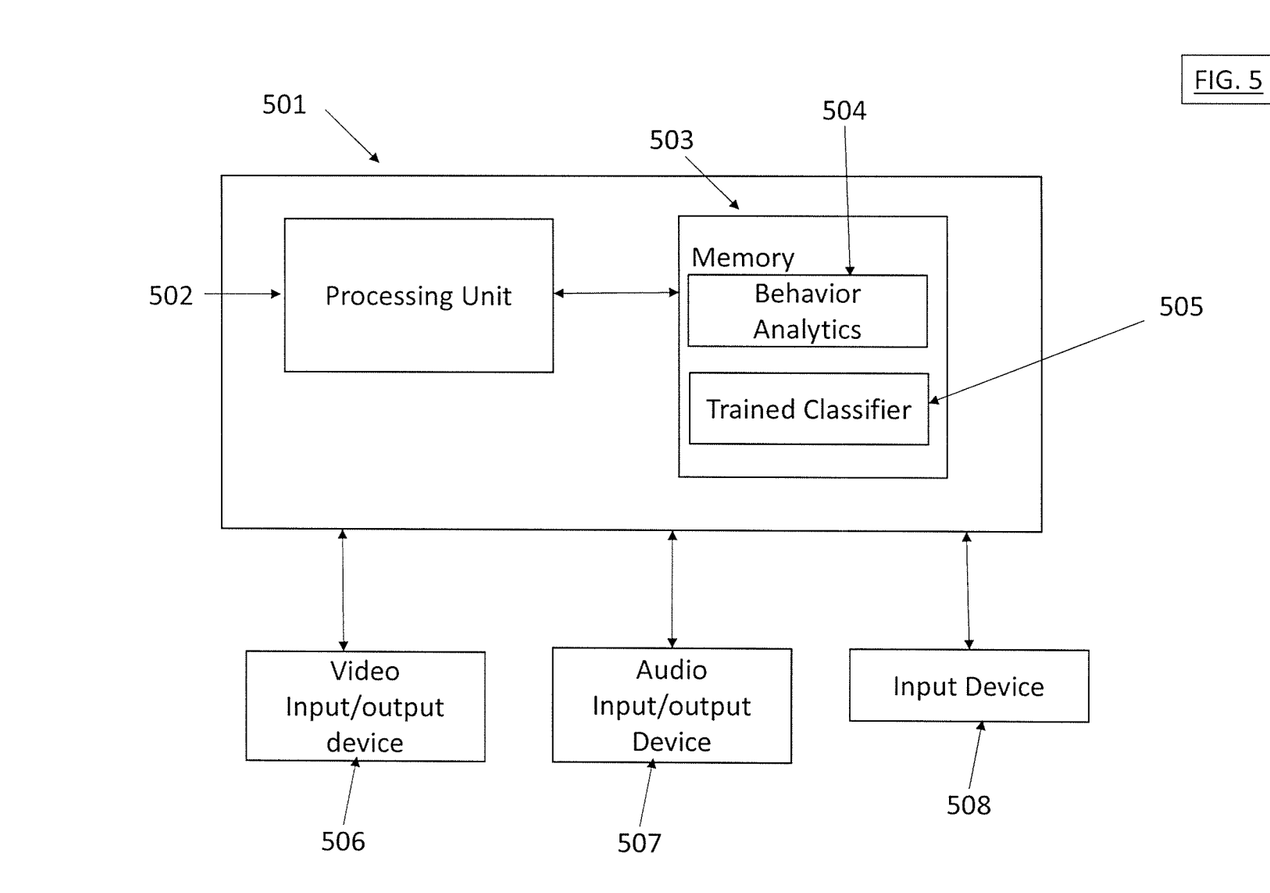
FIG. 5 is a block diagram illustrating a system for operating a teleconference according to an exemplary embodiment of the present inventive concept.

FIG. 5 shows a block diagram of a system for operating a teleconference according to an exemplary embodiment of the present inventive concept. It is understood that elements and features not discussed in detail may be assumed to be similar to corresponding elements and features already discussed.

The system for operating the teleconference according to an exemplary embodiment of the present inventive concept includes a teleconference terminal unit 501, a video input/output device 506, an audio input/output device 507, and an input device 508.

The teleconference terminal unit 501 may be similar to the teleconference terminal units 101, 102 and 103 of FIG. 1 and may include a processing unit 502 operatively coupled to the memory 503. The memory 503 may have behavior analytics 504 and a trained classifier 505 loaded therein.

The video input/output device 506, the audio input/output device 507, and the input device 508 may all be operatively coupled to the teleconference terminal unit 501. The video input/output device 506 may be, for example, a display unit and camera (e.g., a webcam connected to the display unit). The audio input/output device 507 may, for example, be a speaker and a microphone. The input device 508 may be, for example, a keyboard and/or a device including a plurality of buttons to input refinements for behavior analytics, such as the teleconference control device 109 illustrated in FIG. 1.

Figure 6:
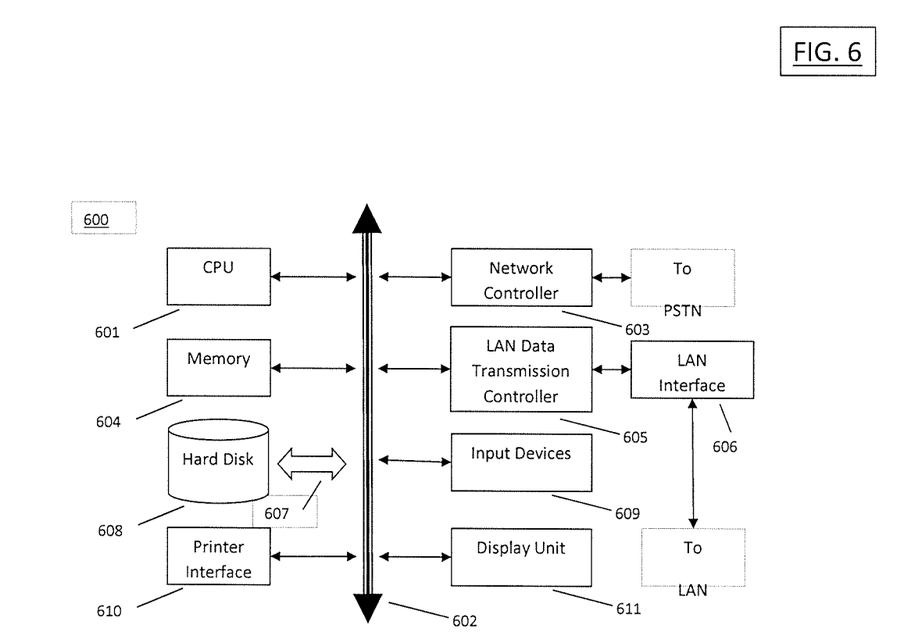
FIG. 6 is a schematic diagram illustrating an example of a computer system capable of implementing methods and systems according to exemplary embodiments of the present inventive concept.

FIG. 6 shows an example of a computer system which may implement a method and system of the present inventive concept. The system and method of the present inventive concept may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 600 may include, for example, a central processing unit (CPU) 601, random access memory (RAM) 605, a printer interface 610, a display unit 611, a local area network (LAN) data transmission controller 605, a LAN interface 606, a network controller 603, an internal bus 602, and one or more input devices 609, for example, a keyboard, mouse etc. As shown, the system 600 may be connected to a data storage device, for example, a hard disk, 608 via a link 607.

As will be appreciated by one skilled in the art, aspects of the present inventive concept may be embodied as a system, method or computer program product. Accordingly, aspects of the present inventive concept may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive concept may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive concept may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive concept are described herein with reference to flowchart illustrations and/or block diagrams of methods, apparatus (systems) and computer program products according to embodiments of the inventive concept. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present inventive concept. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the inventive concept or from the scope of the appended claims. For example, elements and/or features of different exemplary embodiments may be combined with each other and/or substituted for each other within the scope of this inventive concept and appended claims.

What is claimed is:

1. A method for operating a teleconference, comprising:
receiving a first video and audio signal from a first teleconference participant;
receiving a second video and audio signal from a second teleconference participant;
relaying the first video and audio signal to the second teleconference participant and relaying the second video and audio signal to the first teleconference participant;
analyzing the first video and audio signal using a plurality of behavior analytics to determine a level of participant engagement of the first teleconference participant, wherein the plurality of behavior analytics includes determining an emotional state of the first teleconference participant; and determining that the first teleconference participant is not engaged when the determined level of participant engagement is below a predetermined threshold.

2. A method for operating a teleconference, comprising:
receiving a first video and audio signal from a first teleconference participant;
receiving a second video and audio signal from a second teleconference participant;
relaying the first video and audio signal to the second teleconference participant and relaying the first video and audio signal to the first teleconference participant;
analyzing the first video and audio signal using a plurality of behavior analytics to determine a level of participant engagement of the first teleconference participant; and
determining that the first teleconference participant is not engaged when the determined level of participant engagement is below a predetermined threshold, wherein when it is determined that the first teleconference participant is not engaged, relaying of the first video and audio signal to the second teleconference participant is temporarily discontinued.

3. The method of claim 2, further comprising:
continuing to analyze the first video and audio signal using the plurality of behavior analytics to determine the level of participant engagement of the first teleconference participant;
determining that the first teleconference participant has reengaged when the determined level of participant engagement is above the predetermined threshold; and
resuming the relaying of the first video and audio signal to the second teleconference participant when it is determined that the first teleconference participant has reengaged.

4. The method of claim 1, wherein at least one additional video and audio signal is received from at least one additional teleconference participant, the first and second video and audio signals are relayed to the at least one additional teleconference participant, and the at least one additional video and audio signal is relayed to each of the first and second teleconference participants.

5. The method of claim 1, further comprising:
analyzing the second video and audio signal using the plurality of behavior analytics to determine a level of participant engagement of the second teleconference participant; and
determining that the second teleconference participant is not engaged when the determined level of participant engagement of the second teleconference participant is below the predetermined threshold.

6. The method of claim 5, wherein when it is determined that the second teleconference participant is not engaged, relaying of the second video and audio signal to the first teleconference participant is temporarily discontinued.

7. The method of claim 1, wherein when it is determined that the first teleconference participant is not engaged, relaying of the first video and audio signal to the second teleconference participant is performed at a reduced bandwidth.

8. The method of claim 1, wherein the plurality of behavior analytics further includes:
determining whether the first teleconference participant is talking to someone or something other than the teleconference;
determining whether the first teleconference participant has turned away from the teleconference;
determining whether the first teleconference participant is engaged in operating, or is receiving a ring from, a telephone unrelated to the teleconference; or
determining a level of alertness of the first teleconference participant.

9. The method of claim 1, wherein the plurality of behavior analytics used to determine the level of participant engagement of the first teleconference participant are generated using one or more machine learning techniques.

10. The method of claim 9, wherein one or more of the plurality of behavior analytics is refined using input from the first or second teleconference participants during the teleconference.

11. A method for training a classifier for determining whether a teleconference participant is engaged in a teleconference, comprising:
receiving a plurality of video and audio signals from one or more teleconference participants participating in one or more teleconferences;
receiving classification data classifying the one or more teleconference participants as engaged or not engaged, based on their observed behavior; and
using one or more computer learning techniques to train the classifier for determining whether a teleconference participant is engaged in a teleconference, using the receiving a plurality of video and audio signals from one or more teleconference participants participating in one or more teleconferences and the received classification data, as training data, wherein the trained classifier is used to determine whether two or more participants in a subsequent teleconference are engaged.

12. The method of claim 11, wherein the trained classifier is refined during the subsequent teleconference based on input from the two or more participants.

13. A computer program product for operating a teleconference, the computer program product comprising non-transitory computer readable storage medium having program instructions embodied therewith, the program instructions executable by a computer to cause the computer to:
receive, by the computer, a first video and audio signal front a first teleconference participant;
receive, by the computer, a second video and audio signal from a second teleconference participant;
relay, by the computer, the first video and audio signal to the second teleconference participant and relaying, by the computer, the second video and audio signal to the first teleconference participant;
analyze, by the computer, the first video and audio signal using a plurality of behavior analytics to determine a level of participant engagement of the first teleconference participant, wherein the plurality of behavior analytics includes determining a level of alertness of the first teleconference participant; and
determine, by the computer, that the first teleconference participant is not engaged when the determined level of participant engagement is below a predetermined threshold.

14. The computer program product of claim 13, wherein the plurality of behavior analytics includes:
determining whether the first teleconference participant is talking to someone or something other than the teleconference;
determining whether the first teleconference participant has turned away from the teleconference;

determining whether the first teleconference participant is engaged in operating, or is receiving a ring from, a telephone unrelated to the teleconference; or determining an emotional state of the first teleconference participant.

15. The computer program product of claim 13, wherein when it is determined that the first teleconference participant is not engaged, relaying of the first video and audio signal to the second teleconference participant is temporarily discontinued.

16. The computer program product of claim 13, wherein when it is determined that the first teleconference participant is not engaged, relaying of the first video and audio signal to the second teleconference participant is performed at a reduced bandwidth.

17. The computer program product of claim 13, wherein the plurality of behavior analytics used to determine the level of participant engagement of the first teleconference participant are generated using one or more machine learning techniques.

18. The computer program product of claim 17, wherein one or more of the plurality of behavior analytics is refined using input from the first or second teleconference participants during the teleconference.

* * * * *